UNITED STATES PATENT OFFICE.

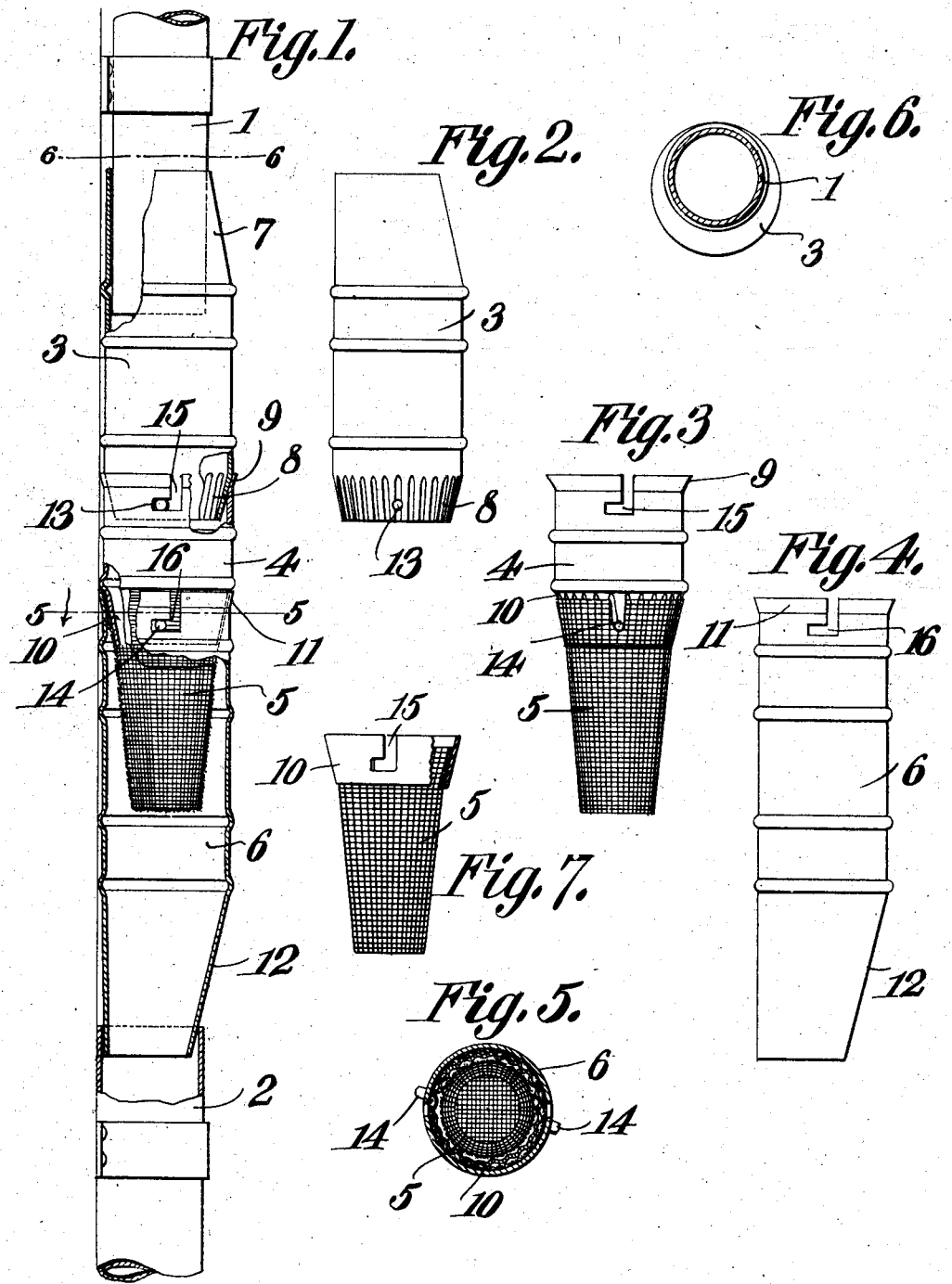

ELKANAH G. WILLIAMS, OF HARPSTER, OHIO, ASSIGNOR OF ONE-HALF TO CHARLES H. LEWIS, OF HARPSTER, OHIO.

FILTER ATTACHMENT.

No. 834,431.　　　　Specification of Letters Patent.　　　　Patented Oct. 30, 1906.

Application filed July 11, 1906. Serial No. 325,705.

*To all whom it may concern:*

Be it known that I, ELKANAH G. WILLIAMS, a citizen of the United States, residing at Harpster, in the county of Wyandot and State of Ohio, have invented a new and useful Filter Attachment, of which the following is a specification.

This invention relates to a filter attachment particularly adapted for use in connection with cistern-pipes, although it can be used for other purposes, if desired.

The objects of the invention are to improve and simplify the construction of such devices; furthermore, to increase their efficiency in operation and to decrease the expense attending their manufacture.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of the following claims without departing from the spirit of the invention or sacrificing any of its advantages.

In the accompanying drawings, forming part of this specification, Figure 1 is a side elevation, partly in section, of a filter attachment constructed in accordance with the present invention. Fig. 2 is a side elevation of the inlet-section. Fig. 3 is a similar view of the filter-section with the filter element detachably secured thereto. Fig. 4 is a similar view of the outlet-section. Fig. 5 is a transverse section on the line 5 5 of Fig. 1. Fig. 6 is a transverse section on the line 6 6 of Fig. 1. Fig. 7 is a side elevation, partly in section, of a modified form of filter-section and filter element.

Like reference-numerals indicate corresponding parts in the different figures of the drawings.

The reference-numeral 1 indicates the inlet portion of a main supply-pipe, which I shall hereinafter term the "main inlet," and the reference-numeral 2 indicates the outlet portion of the main supply-pipe, which I shall hereinafter call the "main outlet." These main inlet and outlet pipes may be of any suitable form and proportion, and they may connect with the roof of the house or with any other suitable source of water-supply and lead into a cistern or other reservoir in which it is desired to collect a supply of strained or filtered water.

The improved filter of the present invention preferably comprises an inlet-section 3, a filter-section 4, a filter element 5, and an outlet-section 6.

In order to provide sufficient space for the filter element 5, so as to permit it to perform its function even when it is partly clogged with sediment or other material, said filter element, together with the filter-section 4 and the adjoining portions of the inlet-section 3 and the outlet-section 6, are of considerably larger diameter than the main inlet and outlet sections 1 and 2, as shown in the drawings, and in order that the main inlet and outlet sections 1 and 2, together with the sections 3, 4, and 5, may be placed flat against the wall of a house or other support the enlarged sections 3, 4, and 5, which preferably are circular in cross-section, the same as the main inlet 1 and the main outlet 2, are eccentrically arranged with respect to said main inlet and outlet, so that their outer portions will be laterally offset with respect to the inlet and outlet pipes 1 and 2, Fig. 6. By arranging the sections in the manner described the entire device can be placed flat against the wall, as will be apparent.

The inlet-section 3 at its upper end is tapered, as indicated at 7, and is fitted around the lower end of the main inlet 1, said section 3 being preferably telescoped upward upon the main inlet 1 for a distance which is slightly longer than the filter-section 4, for a purpose hereinafter described. At its lower end the inlet-section 3 is formed with a tapered portion 8, which preferably is produced by crimping the lower end of said section, as shown.

The upper end of the filter-section 4 preferably is slightly expanded or flared, as indicated at 9, so as to fit around the lower tapered portion or end 8 of the inlet-section 3. At its lower end the filter-section 4 preferably is crimped or otherwise formed with a tapered portion 10, which is fitted into the flared or expanded upper end 11 of the outlet-section 6. At its lower end the outlet-section 6 preferably is tapered, as indicated at 12, and is fitted into the upper end of the main outlet 2, as shown.

The preferred means for connecting the sections 3, 4, and 5 with each other consists of a pair of diametrically opposite radially-extending pins 13 13 and 14 14 on the lower tapered ends of the sections 3 and 4, respectively, and a pair of bayonet-slots 15 15 and 16 16 on the sections 4 and 6, respectively. As shown clearly in the drawings, the radial pins 13 of the inlet-section 3 are adapted to fit into the bayonet-slots 15 of the filter-section 4, and the radial pins 14 of the filter-section 4 are adapted to fit into the bayonet-slots 16 of the outlet-sections 6, thus constituting simple means for detachably securing these different sections together.

While the filter element 5 may be of any suitable form or construction, said element preferably comprises a tapered wire cage, the large end of which is of proper size to fit accurately between the tapered end 10 of the filter-section 4 and the flared end 11 of the outlet-section 6, so that when the sections 4 and 6 are fitted together the filter element 5 is securely held in place without the use of any other fastening means, said filter element of course being prevented from slipping downward by reason of the fact that its upper end is of sufficient diameter to rest against the flared portion 11 of the section 6, and said filter element 5 being prevented from becoming upwardly displaced not only by the force of the water, but also by the tapered end 10 of the section 4, which presses it firmly against the section 6, as described. By reason of this simple construction it will be apparent that whenever the filter becomes worn or clogged with sediment it can be easily and quickly removed for the purpose of supplying a new filter element or of cleaning the old one.

In the winter-time, for instance, when it is usually no longer desired to use the filter element 5, said filter element, together with the section 4, can be removed entirely from the sections 3 and 6, and said section 3 can be slid downward upon the main inlet 1 until its lower tapered end 8 fits into the upper flared end 11 of the outlet-section 6, in which position the radial pins 13 will be engaged with the bayonet-slots 16 to lock the two sections securely together.

When it is desired to simplify the construction of the filter-section illustrated in Fig. 3, I prefer to employ the form of device illustrated in Fig. 7, wherein the upper portion 4 of the filter-section is dispensed with, so as to leave only the tapered portion 10. In this modified form of the invention the filter element 5 instead of being removably fitted over the exterior of the tapered portion 10 is fitted inside thereof, as shown, and is soldered or otherwise suitably secured in position. Furthermore, the pins 14 are dispensed with, and the bayonet-slots 15 (shown at the upper end of Fig. 3) are formed in the tapered portion 10, as shown in Fig. 7, whereby when the modified form of filter-section carrying the filter element 5 is placed in the upper end of the outlet-section 6, and the inlet-section 3 is fitted down into the tapered portion 10 the pins 13 on the portion 8 of the inlet-section 3 will extend through the slots 15 in the portion 10 and through the slots 16 in the upper end of the outlet-section 6, so as to lock the filter element 5 securely in position.

It will be apparent that by the use of the modified construction shown in Fig. 7 the pins 14 on the tapered portion 10 in Fig. 3 can be dispensed with and all the upper portion 4 of the filter-section can be cut away, whereby the arrangement of the device is considerably simplified.

What is claimed is—

1. A filter attachment comprising a filter-section having a pin and an outlet-section having a bayonet-slot, and a filter element having one end thereof fitted into the joint between the sections and thereby held in place.

2. A filter attachment comprising a section having a tapered portion provided with a pin, a section having a flared portion formed with a bayonet-slot, and a filter element having its large end fitted between the flared and tapered portions of said sections and formed with a bayonet-slot.

3. A filter attachment comprising a main inlet, a main outlet, an inlet-section, an outlet-section, a filter-section and a filter element, said inlet-section being telescoped upon the lower end of the main inlet for a distance slightly exceeding the length of the filter-section, whereby said filter-section can be removed and the inlet and outlet sections connected with each other.

4. A filter attachment comprising a main inlet, an inlet-section having a tapered upper end telescoped upon the main inlet, said inlet-section having a tapered lower end, a filter-section having a flared upper end to receive the tapered end of the inlet-section, said filter-section having a tapered lower end, an outlet-section having a flared upper end to receive the tapered lower end of the filter-section, a filter element having its upper end fitted between the upper and lower ends of the filter and outlet sections, the lower end of the outlet-section being tapered, a main outlet fitted around the tapered lower end of the outlet-section, said inlet and outlet sections and said filter-section being larger in diameter than said main inlet and outlet and being eccentrically arranged with respect thereto, and pin-and-slot means for detachably connecting said inlet and outlet sections with said filter-section.

In testimony that I claim the foregoing as my own I have hereto affixed my signature in the presence of two witnesses.

ELKANAH G. WILLIAMS.

Witnesses:
R. CAREY,
J. L. LEWIS.